(12) United States Patent
Zanini-Fisher et al.

(10) Patent No.: US 6,272,849 B1
(45) Date of Patent: Aug. 14, 2001

(54) APPARATUS AND METHOD FOR HEATING AN AUTOMOTIVE CATALYST TO AN EMISSION REACTIVE CONDITION

(75) Inventors: Margherita Zanini-Fisher, Bloomfield Township; Eva Thanasiu, Trenton; Jeffrey Scott Hepburn, Birmingham, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/482,299

(22) Filed: Jan. 13, 2000

(51) Int. Cl.[7] ........................................ F01N 3/00
(52) U.S. Cl. .................................... 60/275; 60/284
(58) Field of Search ........................ 60/274, 275, 284, 60/286, 303

(56) References Cited

U.S. PATENT DOCUMENTS

| | | | |
|---|---|---|---|
| 3,842,600 | * 10/1974 | Nakajima et al. | 60/276 |
| 5,272,871 | * 12/1993 | Oshima et al. | 60/286 |
| 5,412,946 | * 5/1995 | Oshima et al. | 60/286 |
| 5,685,145 | * 11/1997 | Sung et al. | 60/284 |
| 5,753,188 | * 5/1998 | Shimoda et al. | 60/286 |
| 5,813,222 | 9/1998 | Appleby . | |
| 5,845,485 | 12/1998 | Murphy et al. . | |
| 5,921,076 | * 7/1999 | Krutzsch et al. | 60/286 |
| 5,953,908 | 9/1999 | Appleby . | |
| 5,964,089 | 10/1999 | Murphy et al. . | |
| 6,006,515 | * 12/1999 | Wakamoto | 60/274 |
| 6,122,909 | * 9/2000 | Murphy et al. | 60/286 |

FOREIGN PATENT DOCUMENTS

4318214 * 9/1992 (JP) .

* cited by examiner

Primary Examiner—Thomas Denion
Assistant Examiner—Diem Tran
(74) Attorney, Agent, or Firm—Joseph W. Malleck

(57) ABSTRACT

A method of conditioning an automotive catalyst by (a) electrolyzing water on-board the vehicle to derive and store separate quantities of hydrogen and oxygen at pressures in the range of 50–100 psi; (b) immediately upon initiation of engine starting, rapidly transferring stoichiometric proportions of the separated and stored hydrogen and oxygen to a front face location of a catalyst substrate to heat the catalyst substrate by spontaneous catalytic recombination of the hydrogen and oxygen and thereby raise the temperature of the catalyst substrate rapidly to a temperature at which certain emissions can be catalytically converted; (c) complete cranking of the engine to admit emissions laden with CO and HC to the catalyst substrate while continuing to transfer stoichiometric proportions of the hydrogen and oxygen to said front face location for raising the substrate temperature to about 300° C.; and ceasing introduction of the hydrogen and oxygen when the catalyst substrate has reached a full operational temperature for optimum emission conversion Apparatus for pre-heating an automotive catalyst, comprising: an on-board electrolysis system for producing and separately storing quantities of relatively pure hydrogen and oxygen in stoichiometric proportions and at generally equal pressures; a frontal catalyst face defining entrances to multi-channeled catalyst laden flow paths; controllable transfer lines for selectively communicating hydrogen and oxygen to the front face whereby efficient spontaneous exothermic recombination of hydrogen and oxygen may take place immediately.

3 Claims, 2 Drawing Sheets

APPARATUS AND METHOD FOR HEATING AN AUTOMOTIVE CATALYST TO AN EMISSION REACTIVE CONDITION

BACKGROUND OF THE INVENTION

1. Technical Field

This invention relates generally to the field of automotive catalysts for reduction of emissions from a fossil fueled internal combustion engine, and more particularly to technology for heating such catalyst by spontaneous combustion of hydrogen when exposed to the catalyst independent of any emissions.

2. Discussion of the Prior Art

A group of recently issued and related patents (U.S. Pat. Nos. 5,813,222; 5,953,908; 5,964,089; 5,845,485; and 5,964,089) disclose a method and apparatus to achieve heating of the catalyst by introducing a mixture of air and hydrogen to either the combustion chamber of the engine or to the air existing in the exhaust pipe upstream of a catalytic converter. The mixture is intended to combust within the engine to carry heat to the catalyst or spontaneously and exothermically combust when it is exposed to the catalyst. Hydrogen is supplied from a storage tank that is regularly filled with hydrogen produced on board the automotive vehicle by an electrolysis system. On-board electrolysis systems are readily known in the art as evidenced by the discussions in the above referenced patents. The systems essentially use electrical energy, derived from the vehicle's storage battery or generator, to disassociate water into its constituents, one of which is hydrogen. Care is taken to filter and purify the hydrogen to be free of any oxygen and other contaminants by reforming water with the constituent oxygen. The main body of electrolysis oxygen that is not contaminating the hydrogen is vented to atmosphere. Hydrogen is delivered to the air mixture for spontaneous combustion at a pressure of about 30–45 psig, is dispersed at flow rates of 80–200 liters per minute so that it constitutes 1–28% of the mixture. Due to the inefficiency of adding hydrogen to air at a location well upstream of the catalyst, the patents suggest adding a small electrical heater in instances where the ambient temperature conditions can be as low as −7° C. (see '222 patent at column 9, lines 28–35). Such a proposal points out the shortcomings of the state of the art. Such patents also take the electrolysis oxygen and add it to the air flow when creating the combustible mixture, as the patents suggest. Unfortunately this does little to change the inefficiency of the approach.

SUMMARY OF THE INVENTION

It is an object of this invention to overcome the inefficiencies of the prior art by (i) utilizing essentially the exact stoichiometric proportions of hydrogen and oxygen produced by the on-board electrolysis system and avoid any use of air that can contribute as a source of oxygen for the spontaneous catalyzed combustion, and (ii) prevent creation of the mixture until it can be introduced at the immediate face of the precious metal laden automotive catalyst.

In a first aspect, the invention is a method of conditioning an automotive catalyst of the type that induces reactive catalysis of HC and CO introduced to such catalyst as engine exhaust gas from an automotive engine of a vehicle. The method comprises the steps of: (a) electrolyzing water on-board said vehicle to derive and store separate proportions of hydrogen and oxygen at pressures in the range of 50–100 psi, (b) immediately upon initiation of engine starting, rapidly transferring stoichiometric proportions of the separated and stored hydrogen and oxygen to a front face location of a catalyst substrate to heat the catalyst substrate by spontaneous catalytic recombination of the hydrogen and oxygen and thereby more efficiently raise the temperature of the catalyst substrate rapidly to a temperature at which certain emissions can be catalytically converted, (c) complete cranking of the engine to admit emissions laden with CO and HC to the catalyst substrate while continuing to transfer stoichiometric proportions of the hydrogen and oxygen to the front face location for raising the substrate temperature to about 300° C., and (d) ceasing introduction of the hydrogen and oxygen when the catalyst substrate has reached full operational temperature for optimum emission conversion.

The invention, in a second aspect, is an apparatus for heating an automotive catalyst to a catalytically reactive condition for automotive emissions, comprising (a) an on-board electrolysis system for producing and separately storing quantities of relatively pure hydrogen and oxygen in stroichiometric proportions and at generally equal pressures, (b) a frontal catalyst face defining entrances to multi-channeled catalyst laden flow paths, and (c) a controllable transfer line for selectively communicating hydrogen and a controllable transfer line for selectively communicating oxygen, the communications being to the front face whereby efficient spontaneous exothermic recombination of the hydrogen and oxygen may take place immediately upon being transferred to such location regardless of ambient temperatures.

DESCRIPTION AND BEST MODE

Figure 1:
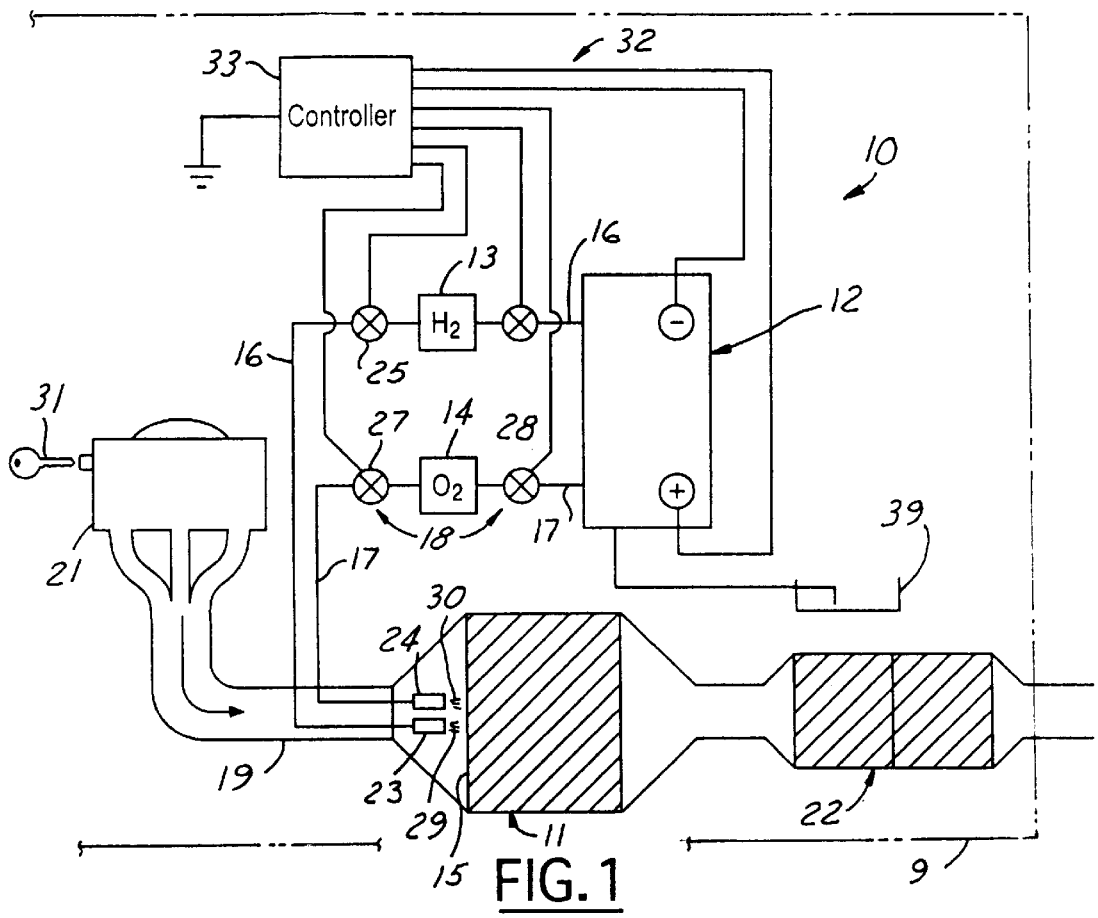
FIG. 1 is a schematic layout of an on-board vehicular apparatus embodying this invention for rapidly heating a catalyst from cold-start.

As shown in FIG. 1, an apparatus 10 is carried on-board a vehicle 9 and is used to very rapidly preheat an automotive close-coupled light-off catalyst 11 to an effective emission conversion temperature from a cold start or ambient temperature condition. The apparatus broadly comprises an electrolysis system 12 for generating hydrogen and oxygen, a frontal catalyst face 15, gas transfer lines 16 and 17 leading from the electrolysis system to the frontal catalyst face 15, storage tanks 13, 14 residing respectively in such transfer lines, and valves 18 for selectively controlling gas flow through the transfer lines to or from the storage tanks.

Catalyst 11 is carried on the vehicle 9 and is supported in exhaust pipe 19 in a position relatively close to manifold 20 of a fossil-fueled internal combustion engine 21. Apparatus 10 causes catalyst 11 to quickly reach 50% conversion efficiency for THC and $NO_x$ emissions in about ⅓ the time it would normally take for state-of-the-art devices to do so and at less cost. Other on-board catalysts, such as underbody catalyst 22 are made more efficient by the enhanced rapid heating action of light-off catalyst 11.

Separate on-board pressurized supplies of relatively pure oxygen and hydrogen in respective tanks 14 and 13 are used to introduce stoichiometric proportions of such gases to the frontal catalyst face 15 (stoichiometric meaning about a 2:1 ratio of $H_2/O_2$) Stoichiometric proportions are created by adapting and sizing the nozzles 23,24 to admit the desired volumetric ratio of hydrogen and oxygen gas. Use and replenishment of the stored gas supplies is controlled by valves 18. Transfer line 16 has electrically actuated solenoid valves 25,26 on opposite sides of tank 13 to selectively draw and/or admit hydrogen to tank 13; transfer line 17 has electrically actuated solenoid valves 27,28 to selectively draw and/or admit oxygen to tank 14. The respective gases are stored at generally equal pressures in the range of 60–100 psi. When the valves 18 are operated to draw hydrogen and oxygen, the gases will flow through their respective lines and through adjacent nozzles 23,24 to produce short diverging and overlapping spray patterns 29,30 that induce immediate gas intermixing of hydrogen and oxygen on the frontal catalyst face 15. This type of mixing allows for some discontinuous sites of hydrogen and oxygen to exist on the face so as to more effectively react with emissions, when they begin to flow, to lower the cold-start conversion temperature for the respective constituents of the emissions and thereby shortening the time to heat up.

No electrical energy is needed at the first instance of use of the stored hydrogen and oxygen. Energy for electrolysis is required sporadically only during times the engine is running and thus reduces energy and equipment requirements.

Figure 2:
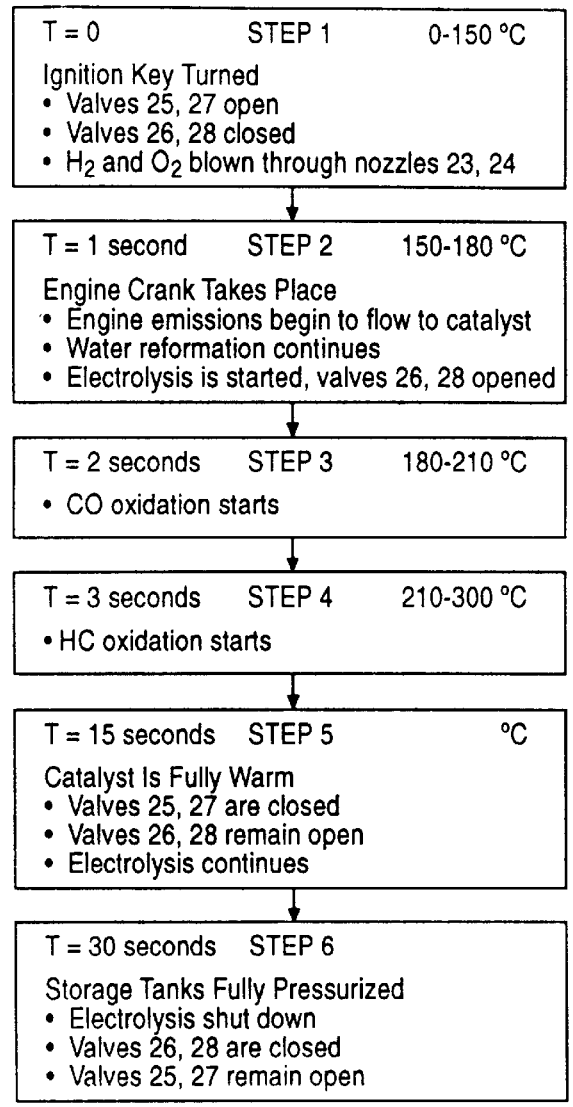
FIG. 2 is a flow diagram of sequential timed steps performed by the apparatus.

As shown schematically in FIG. 2, apparatus 10 is operated in a sequence of steps to achieve the extremely rapid heat-up effect. At step (1), time=0 seconds, ignition key 31 is turned to start the engine 21 and actuate timed circuits 32 (regulated by controller 31) to open valves 25,27 for a period (i.e. 15 seconds) while valves 26,28 remain closed. This admits desired proportions of hydrogen and oxygen to the frontal catalyst face 15 while there is no engine emissions in the exhaust pipe 10 or in catalyst 11. This condition continues for about a one second interval during which time the blown oxygen and hydrogen react with each other in the presence of the catalyst material to exothermically recombine and produce water. This releases heat to the catalyst at an effective rate equivalent to a 400 watt heater; such heating rapidly increases the temperature of at least the frontal catalyst face from ambient to about 125–150° C. The catalyst material is preferably a precious metal selected such as palladium or platinum.

At step (2), time=1 second, the engine 21 cranks rotation of the pistons for about one second which begins to produce some engine exhaust 33 comprised of CO and HC; such exhaust flows into the exhaust pipe at a rate of typically five liters per second. The hydrogen and oxygen now meet with some of such emissions at face 15 during which time continued reaction of hydrogen and oxygen occurs to raise the temperature to about 180° C. With the engine now beginning to run, the electrolysis cell is powered by the timed circuits connections 32 and valves 26,28 are opened allowing for the admission of newly generated hydrogen and oxygen to the storage tanks, The pressure in tanks 13,14 remains in the range of 30–60 psi even though continued withdrawal takes place.

At step (3), time=2 seconds, the temperature of at least the frontal catalyst face rises to a sufficient temperature of about 180° C. to begin inducing oxidation of CO when in the presence of hydrogen and oxygen; the temperature will now rise during the next one second to about 210° C. due primarily to CO oxidation and secondarily to water reformation. Without the use of this invention, Co oxidation would begin at about 221° C. (see FIG. 3).

Figure 3:
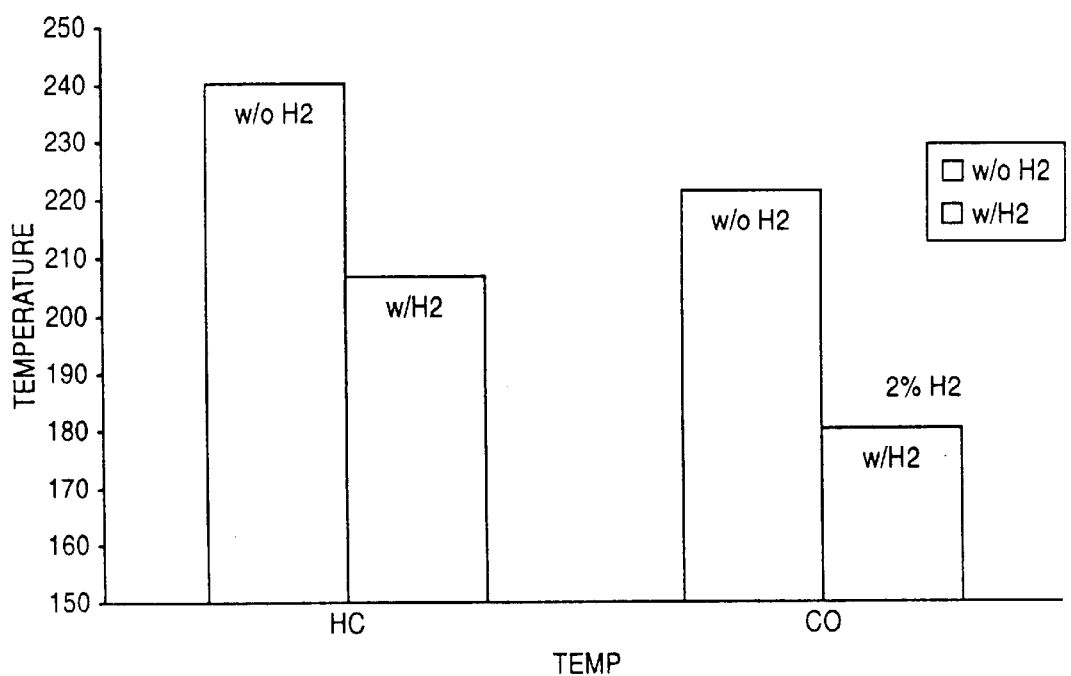
FIG. 3 is a graphical illustration comparing light-off temperatures for catalytic conversion of HC and CO with and without the use of the $H_2$ and $O_2$ combination of this invention.

At step (4), time=3 seconds, the temperature of at least the face is surprisingly able to begin inducing oxidation of HC (when in the presence of the catalyst) at a temperature as low as 210° C., this is lower than that observable by the prior art (see FIG. 3 for comparison). Exothermic oxidation of HC and CO increases the catalyst temperature further; over another period of about 7 seconds, 300° C. will be attained accompanied by a catalyst conversion efficiency of at least 50%. The attainment of 50% efficiency at 300° C. within 10 seconds not only meets federally mandated ULEV standards but does so in ⅓ the time required by such standards. Part of the reason for such rapid increase in temperature, while using such low flow rates of hydrogen and oxygen, is the placement of initial gas mixing at the face of the catalyst; this permits some discontinuous sites of hydrogen relative to CO to induce lower light-off temperatures for the CO and HC. Further admission of hydrogen and oxygen is continued for another 5 seconds to additionally raise the temperature of the catalyst.

At step (5), time=15 seconds, the entire catalyst 11 should be fully warm and be at a temperature of about 350° C. Valves 25,27 are automatically closed while valves 26,28 remain open to allow continued replenishment of hydrogen and oxygen to the tanks 13,14.

At step (6), time=30 seconds, valves 26,28 are automatically closed by the timed circuits 32 and the electrolysis cell is depowered (turned off). The tanks 13,14 are now ready to supply the necessary gases to achieve a preheating effect should the engine need to be restarted.

Figure 4:
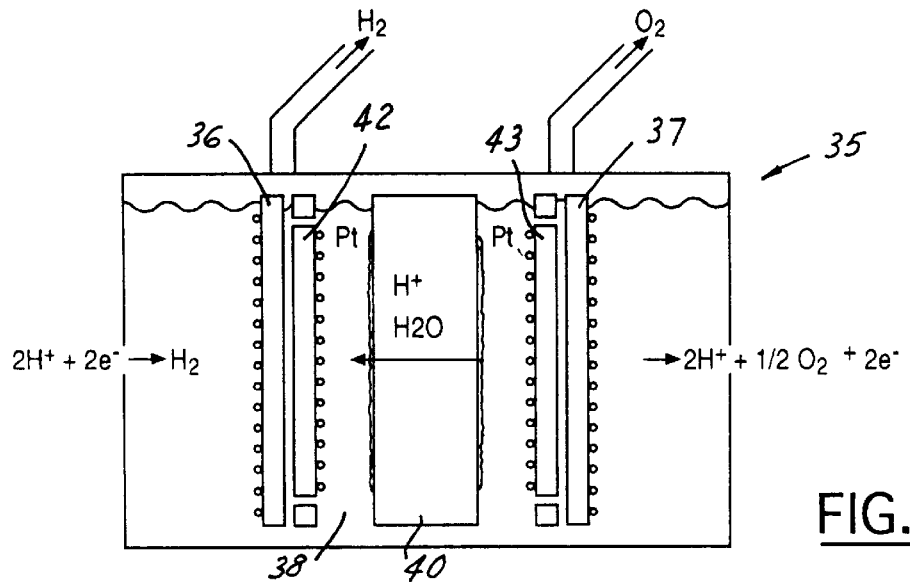
FIG. 4 is a general illustration of one type of electrolytic system that may be used on-board an automotive vehicle which facilitates carrying out this invention.

FIG. 4 illustrates one form of an on-board electrolytic cell 35; the cell has a cathode 36 and anode 37 placed adjacent a solid phase polymer electrolyte 38. The cell is filled with deionized water from a reservoir 39 (the water having a quality similar to that used for filling battery cells) to keep the electrolyte and electrodes wet. An ion exchange membrane 40 (coated with Pt precious metal on opposite sides) separates the cathode and anode. The membrane 40 is supplied with electrical power, from a source connected to controller 31 or a battery, to induce circulation of the electrolyte and hydrogen there through. Elements 42,43 separate the generated oxygen and hydrogen. At the anode 37, water is disassociated into hydrogen and oxygen ions accompanied by release of electrons to the anode. Hydrogen ions migrate through the membrane to collect at the cathode 36 where they evolve in hydrogen molecules by addition of electrons from the cathode. Generated oxygen particles collect about the anode and form oxygen gas with sufficient pressure to flow to the storage tank 14 via transfer line 17. Generated hydrogen gas collects along the cathode and does so with sufficient pressure to flow to tank 13 via transfer line 16.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of conditioning an automotive catalyst of the type that induces reactive catalysis of HC and CO introduced to such catalyst as engine exhaust gas from an engine of a vehicle, the method comprising:

(a) electrolyzing water on-board said vehicle to derive and store separate proportions of hydrogen and oxygen at pressures in the range of 50–100 psi;

(b) immediately upon initiation of engine starting, rapidly transferring stoichiometric proportions of the separated and stored hydrogen and oxygen to a fron face location of a catalyst substrate to heat the catalyst substrate by spontaneous catalytic recombination of the hydrogen and oxygen and thereby raise the temperature of the catalyst substrate rapidly to a temperature at which certain emissions can be catalytically converted;

(c) complete cranking of the engine to admit emissions laden with CO and HC to the catalyst substrate while continuing to transfer stoichiometric proportions of the hydrogen and oxygen to said front face location for raising the substrate temperature to about 300° C.; and (d) ceasing introduction of the hydrogen and oxygen when the catalyst substrate has reached a full operational temperature for optimum emission conversion.

2. The method as in claim 1, in which during step (c), electrolyzing is electrically energized and electrolyzing is de-energized after about 15 seconds after completion of step (d).

3. The apparatus as in claim 1, in which said nozzles deliver diverging and overlapping sprays of said hydrogen and oxygen which allows some discontinuous sites of hydrogen and emission gases that promote lower temperature light-off of the emissions.

* * * * *